(12) United States Patent
Liu et al.

(10) Patent No.: US 7,938,877 B2
(45) Date of Patent: May 10, 2011

(54) LOW COEFFICIENT OF THERMAL EXPANSION MATERIALS INCLUDING MODIFIED ALUMINOSILICATE FIBERS AND METHODS OF MANUFACTURE

(75) Inventors: James Jenq Liu, Mason, OH (US); William M. Carty, Alfred Station, NY (US); Bilal Zuberi, Cambridge, MA (US); Sunilkumar C. Pillai, North Billerica, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 329 days.

(21) Appl. No.: 12/104,977

(22) Filed: Apr. 17, 2008

(65) Prior Publication Data
US 2008/0241014 A1    Oct. 2, 2008

Related U.S. Application Data

(63) Continuation-in-part of application No. 11/323,429, filed on Dec. 30, 2005, now abandoned.

(60) Provisional application No. 60/737,237, filed on Nov. 16, 2005.

(51) Int. Cl.
*B01D 39/20* (2006.01)
*B01D 46/00* (2006.01)
*C04B 35/03* (2006.01)

(52) U.S. Cl. .......... 55/523; 55/282.3; 55/385.3; 55/524; 60/311; 422/180; 423/213.5; 264/44; 264/628; 264/630; 501/6; 501/7; 501/95.1

(58) Field of Classification Search ............... 55/282.2, 55/282.3, 385.3, 486, 487, 523, 524, DIG. 5, 55/DIG. 10, DIG. 30; 60/297, 299, 301, 60/311; 422/177, 180; 423/213.2, 213.5, 327.2; 428/116, 117, 118; 502/439; 264/43, 44, 628, 630, 631, DIG. 48; 501/5, 6, 7, 8, 128, 95.1

See application file for complete search history.

(56) References Cited

U.S. PATENT DOCUMENTS

| | | | |
|---|---|---|---|
| 1,335,466 A | 3/1920 | Stevenson |
| 1,533,813 A | 4/1925 | Schroeder |
| 1,993,821 A | 3/1935 | Benner et al. |
| 2,752,001 A | 6/1956 | Muller |
| 3,790,654 A | 2/1974 | Bagley |
| 3,819,334 A | 6/1974 | Yoshida et al. |
| 3,899,555 A | 8/1975 | Takeo et al. |
| 3,912,658 A | 10/1975 | Kaneko et al. |

(Continued)

FOREIGN PATENT DOCUMENTS
CN    1349839    5/2002
(Continued)

OTHER PUBLICATIONS

"Fiber-reinforced SiC", *Jpn. Technol. Highlights*, vol. 6, No. 4, ISSN: 1060-8117,(Feb. 22, 1995),15.

(Continued)

*Primary Examiner* — Jason M Greene (57) ABSTRACT

A fibrous ceramic material comprises a plurality of fibers having a modified aluminosilicate compositional structure (i.e., $x(RO).y(Al_2O_3).z(SiO_2)$ or $w(MO).x(RO).y(Al_2O_3).z(SiO_2)$). The fibrous ceramic material is form by combining two or more $x(RO).y(Al_2O_3).z(SiO_2)$ or $w(MO).x(RO).y(Al_2O_3).z(SiO_2)$ precursors in which at least one of the two or more precursors is in fiber form. The resulting fibrous ceramic material has a low coefficient of thermal expansion (i.e., $\leq 4.7 \times 10^{-6}/°C$).

25 Claims, 6 Drawing Sheets

U.S. PATENT DOCUMENTS

| | | |
|---|---|---|
| 3,961,907 A | 6/1976 | Close et al. |
| 4,047,965 A | 9/1977 | Karst et al. |
| 4,053,011 A | 10/1977 | Riewald et al. |
| 4,071,594 A | 1/1978 | Pearson et al. |
| 4,169,911 A | 10/1979 | Yoshida et al. |
| 4,329,162 A | 5/1982 | Pitcher, Jr. |
| 4,402,893 A | 9/1983 | Kitamura et al. |
| 4,409,284 A | 10/1983 | Sugino et al. |
| 4,416,676 A * | 11/1983 | Montierth ............ 55/523 |
| 4,417,908 A | 11/1983 | Pitcher, Jr. |
| 4,419,108 A * | 12/1983 | Frost et al. ............ 95/286 |
| 4,420,316 A | 12/1983 | Frost et al. |
| 4,448,833 A | 5/1984 | Yamaguchi et al. |
| 4,608,361 A | 8/1986 | Kanamori et al. |
| 4,652,286 A | 3/1987 | Kusuda et al. |
| 4,761,323 A | 8/1988 | Muhlratzer et al. |
| 4,810,458 A | 3/1989 | Oshima |
| 4,824,711 A | 4/1989 | Cagliostro et al. |
| 4,828,785 A | 5/1989 | Newkirk et al. |
| 4,833,115 A | 5/1989 | Koschlig et al. |
| 4,868,142 A | 9/1989 | Waisala |
| 4,966,873 A | 10/1990 | Iida et al. |
| 4,968,467 A | 11/1990 | Zievers |
| 5,053,092 A | 10/1991 | Lachman |
| 5,070,588 A | 12/1991 | Miwa et al. |
| 5,075,160 A | 12/1991 | Stinton et al. |
| 5,078,818 A | 1/1992 | Han et al. |
| 5,098,455 A | 3/1992 | Doty et al. |
| 5,123,243 A | 6/1992 | Baddour |
| 5,126,431 A | 6/1992 | Nesheiwat |
| 5,153,057 A | 10/1992 | Corbett |
| 5,194,407 A | 3/1993 | Waisala et al. |
| 5,194,414 A | 3/1993 | Kuma |
| 5,196,120 A | 3/1993 | White |
| 5,207,807 A | 5/1993 | Manfre et al. |
| 5,249,948 A | 10/1993 | Koslow |
| 5,251,564 A | 10/1993 | Rim et al. |
| 5,260,035 A | 11/1993 | Lachman et al. |
| 5,298,046 A | 3/1994 | Peisert |
| 5,316,710 A | 5/1994 | Tasaki et al. |
| 5,322,537 A | 6/1994 | Nakamura et al. |
| 5,335,712 A | 8/1994 | Corbett et al. |
| 5,338,253 A | 8/1994 | Damsohn et al. |
| 5,348,987 A | 9/1994 | Kato et al. |
| 5,376,341 A | 12/1994 | Gulati |
| 5,488,017 A | 1/1996 | Szweda et al. |
| 5,492,580 A | 2/1996 | Frank |
| 5,518,678 A | 5/1996 | Miyamoto et al. |
| 5,518,833 A | 5/1996 | Repplinger et al. |
| 5,545,297 A | 8/1996 | Andersen et al. |
| 5,549,725 A * | 8/1996 | Kasai et al. ............ 55/523 |
| 5,549,859 A | 8/1996 | Andersen et al. |
| 5,611,831 A | 3/1997 | Matsuoka et al. |
| 5,622,041 A | 4/1997 | Feeley et al. |
| 5,623,013 A | 4/1997 | Tanaka et al. |
| 5,629,067 A | 5/1997 | Kotani et al. |
| 5,662,731 A | 9/1997 | Andersen et al. |
| 5,681,373 A | 10/1997 | Taylor et al. |
| 5,707,584 A | 1/1998 | Terpstra et al. |
| 5,714,226 A | 2/1998 | Disselbeck |
| 5,750,026 A | 5/1998 | Gadkaree et al. |
| 5,759,219 A | 6/1998 | Rink et al. |
| 5,820,833 A | 10/1998 | Kawamura |
| 5,851,326 A | 12/1998 | Custer et al. |
| 5,853,439 A | 12/1998 | Gieseke et al. |
| 5,900,207 A | 5/1999 | Danforth et al. |
| 5,914,187 A | 6/1999 | Naruse et al. |
| 5,948,257 A | 9/1999 | Custer et al. |
| 5,998,328 A | 12/1999 | Dawes et al. |
| 6,040,266 A | 3/2000 | Fay et al. |
| 6,057,030 A | 5/2000 | Mano |
| 6,117,518 A | 9/2000 | Cawse et al. |
| 6,155,432 A | 12/2000 | Wilson et al. |
| 6,179,460 B1 | 1/2001 | Burkhardt et al. |
| 6,194,066 B1 | 2/2001 | Hoffman |
| 6,228,293 B1 | 5/2001 | Kriegsmann et al. |
| 6,238,618 B1 | 5/2001 | Brundage et al. |
| 6,261,510 B1 | 7/2001 | Terpstra et al. |
| 6,300,263 B1 | 10/2001 | Merkel |
| 6,321,915 B1 | 11/2001 | Wilson et al. |
| 6,365,092 B1 | 4/2002 | Backa |
| 6,375,450 B1 | 4/2002 | Golumb et al. |
| 6,379,446 B1 | 4/2002 | Andersen et al. |
| 6,423,537 B1 | 7/2002 | Soria et al. |
| 6,444,006 B1 | 9/2002 | Haberkamp et al. |
| 6,471,394 B2 | 10/2002 | Kesig |
| 6,506,336 B1 | 1/2003 | Beall et al. |
| 6,547,967 B1 | 4/2003 | Adler et al. |
| 6,566,290 B2 * | 5/2003 | Beall et al. ............ 501/128 |
| 6,582,490 B2 | 6/2003 | Miller et al. |
| 6,613,384 B1 | 9/2003 | Waller |
| 6,651,773 B1 | 11/2003 | Marocco |
| 6,669,751 B1 | 12/2003 | Ohno et al. |
| 6,716,376 B1 | 4/2004 | Haug et al. |
| 6,860,917 B2 | 3/2005 | Henrichsen et al. |
| 6,881,361 B1 | 4/2005 | Schulze et al. |
| 6,899,777 B2 | 5/2005 | Vaidyanathan et al. |
| 6,935,461 B2 | 8/2005 | Marocco |
| 6,946,013 B2 | 9/2005 | Alward et al. |
| 6,991,672 B2 | 1/2006 | Marrecau |
| 6,991,673 B2 | 1/2006 | Wastijn et al. |
| 7,041,359 B2 | 5/2006 | Hijikata |
| 7,052,532 B1 | 5/2006 | Liu et al. |
| 7,052,760 B2 | 5/2006 | Hijikata |
| 7,078,004 B2 | 7/2006 | Voss et al. |
| 7,078,086 B2 | 7/2006 | Hijikata |
| 7,083,842 B2 | 8/2006 | Masukawa et al. |
| 7,090,715 B2 | 8/2006 | Chung et al. |
| 7,112,050 B2 | 9/2006 | Bernas et al. |
| 7,138,002 B2 | 11/2006 | Hamanaka et al. |
| 7,138,003 B2 | 11/2006 | Ichikawa et al. |
| 7,179,516 B2 | 2/2007 | Ichikawa |
| 7,404,840 B2 | 7/2008 | Wood et al. |
| 7,486,962 B2 | 2/2009 | Zuberi et al. |
| 7,510,755 B2 | 3/2009 | Masukawa et al. |
| 7,572,311 B2 * | 8/2009 | Zuberi ............ 55/523 |
| 7,578,865 B2 | 8/2009 | Zuberi et al. |
| 2001/0037972 A1 | 11/2001 | Quick et al. |
| 2002/0014723 A1 | 2/2002 | Wallin et al. |
| 2002/0157358 A1* | 10/2002 | Noda et al. ............ 55/282.3 |
| 2003/0101701 A1 | 6/2003 | Henrichsen et al. |
| 2003/0127393 A1 | 7/2003 | Tepper et al. |
| 2003/0131759 A1 | 7/2003 | Francis et al. |
| 2003/0178357 A1 | 9/2003 | Wolff et al. |
| 2004/0029707 A1 | 2/2004 | Beall et al. |
| 2004/0103627 A1 | 6/2004 | Dullien et al. |
| 2004/0115392 A1 | 6/2004 | Miyakawa et al. |
| 2004/0139734 A1 | 7/2004 | Schmeichel et al. |
| 2004/0194505 A1 | 10/2004 | Wang et al. |
| 2004/0231307 A1* | 11/2004 | Wood et al. ............ 55/523 |
| 2004/0250683 A1 | 12/2004 | Soane et al. |
| 2005/0020432 A1 | 1/2005 | Roy et al. |
| 2005/0040003 A1 | 2/2005 | Kienzle et al. |
| 2005/0042151 A1 | 2/2005 | Alward et al. |
| 2005/0049362 A1 | 3/2005 | Buckley et al. |
| 2005/0069469 A1 | 3/2005 | Fu et al. |
| 2005/0074374 A1 | 4/2005 | Ogura |
| 2005/0102987 A1 | 5/2005 | Kudo |
| 2005/0109023 A1 | 5/2005 | Kudo et al. |
| 2005/0120691 A1* | 6/2005 | Miwa ............ 55/523 |
| 2005/0126140 A1 | 6/2005 | Ito et al. |
| 2005/0181193 A1 | 8/2005 | Lenke et al. |
| 2005/0217228 A1 | 10/2005 | Beall et al. |
| 2005/0230029 A1 | 10/2005 | Vaidyanathan et al. |
| 2005/0266991 A1 | 12/2005 | Ohno et al. |
| 2005/0271920 A1 | 12/2005 | Eshraghi et al. |
| 2006/0075731 A1* | 4/2006 | Ohno et al. ............ 55/523 |
| 2006/0154057 A1 | 7/2006 | Nonninger |
| 2006/0272306 A1 | 12/2006 | Kirk et al. |
| 2006/0292393 A1 | 12/2006 | Kunieda |
| 2007/0032370 A1 | 2/2007 | Weisensel et al. |
| 2007/0044443 A1* | 3/2007 | Nixdorf et al. ............ 55/523 |
| 2007/0108647 A1 | 5/2007 | Zuberi et al. |
| 2007/0111878 A1 | 5/2007 | Zuberi et al. |
| 2007/0141255 A1 | 6/2007 | Zuberi |
| 2007/0261557 A1 | 11/2007 | Gadkaree et al. |
| 2009/0041975 A1 | 2/2009 | Kodama et al. |

FOREIGN PATENT DOCUMENTS

| | | |
|---|---|---|
| EP | 0425827 | 5/1991 |
| EP | 0552715 | 7/1993 |
| EP | 0562597 | 9/1993 |
| EP | 0635298 | 1/1995 |
| EP | 0728521 | 8/1996 |
| EP | 00776696 | 6/1997 |
| EP | 01338326 | 8/2003 |
| EP | 01440722 | 7/2004 |
| EP | 01541216 | 6/2005 |
| GB | 2168338 | 6/1986 |
| GB | 2176179 | 12/1986 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |
| JP | 2001-252529 | 9/2001 |
| KR | 2001016633 | 3/2001 |
| WO | WO-97/12410 | 4/1997 |
| WO | WO-97/12844 | 4/1997 |
| WO | WO-2006070540 | 7/2006 |
| WO | WO-2007/054697 | 5/2007 |

OTHER PUBLICATIONS

"Porosity reduces CMC properties", *Adv. Compos. Bull.*, ISSN: 0951-953X,(Feb. 1995),2-3.

"Rapid preforming developed for metal matrix composites", *High-Performance Composites*, vol. 9, No. 1, ISSN: 1081-9223,(Jan.-Feb. 2001),60.

Gulati, Suresh T., "Physical Durability of Thin Wall Ceramic Substrates", *SAE Technical Paper Series 982635*, (Oct. 1998).

"Diesel Filter Materials", *DieselNet Technology Guide*, www.DieselNet.com,(Jan. 2003).

"Wall-Flow Monoliths", *DieselNet Technology Guide*, www.DieselNet.com,(Sep. 2005).

"Ceramic Catalyst Substrates", *DieselNet Technology Guide*, www.DieselNet.com,(Apr. 1997).

"Ceramic Fibers and Cartridges", *DieselNet Technology Guide*, www.DieselNet.com,(Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323,(Mar. 2002).

Li, Cheng G., et al., "Properties and Performance of Diesel Particulate Filters of an Advanced Ceramic Material", *SAE Technical Paper Series*, 2004-01-0955,(Mar. 2004).

Blackburn, Stuart et al., "Mullite-Alumina Composites by Extrusion", *J. Am. Ceram. Soc.* 75[4], (1992),953-957.

\* cited by examiner

LOW COEFFICIENT OF THERMAL EXPANSION MATERIALS INCLUDING MODIFIED ALUMINOSILICATE FIBERS AND METHODS OF MANUFACTURE

RELATED APPLICATIONS

This application is a continuation-in-part of application Ser. No. 11/323,429, filed on Dec. 30, 2005 and entitled "Extruded Porous Substrate and Products Using the Same." application Ser. No. 11/323,429 claims the benefit of provisional application Ser. No. 60/737,237, filed on Nov. 16, 2005. The entire disclosures of application Ser. Nos. 11/323, 429 and 60/737,237 are incorporated herein by reference.

FIELD OF THE INVENTION

The invention generally relates to a fibrous ceramic material, and more particularly to a low coefficient of thermal expansion fibrous material including a plurality of modified aluminosilicate fibers and methods of manufacturing the fibrous material.

BACKGROUND

Advanced ceramic materials are commonly utilized in systems located in hostile environments, such as, for example, automotive engines (e.g., catalytic converters), aerospace applications (e.g., space shuttle titles), refractory operations (e.g., firebrick) and electronics (e.g., capacitors, insulators). Porous ceramic bodies are of particular use as filters in these environments. For example, today's automotive industry uses ceramic honeycomb substrates (i.e., a porous ceramic body) to host catalytic oxidation and reduction of exhaust gases, and to filter particulate emissions. Ceramic honeycomb substrates provide high specific surface area for filtration and support for catalytic reactions and, at the same time, are stable and substantially structurally sound at high operating temperatures associated with an automotive engine environment.

In general, ceramic materials, such as for example, aluminosilicate based ceramics, are inert materials that perform well in high temperature environments. However, ceramic materials are not immune to thermal stresses, such as those stresses generated from cycling between ambient temperature and high temperature applications. Thus, ceramic filters are known to degrade making them inefficient and ineffective for today's applications.

SUMMARY OF THE INVENTION

In general, embodiments described herein feature a fibrous ceramic material that can be utilized in a variety of applications, including as a filter in an automotive engine environment. The fibrous ceramic material includes a plurality of modified aluminosilicate fibers (i.e., fibers having a compositional structure of $x(RO).y(Al_2O_3).z(SiO_2)$ where x is greater than O and RO is an oxide selected from the group consisting of BaO, SrO, $Li_2O$, and $K_2O$). Embodiments described herein also feature methods of making the fibrous ceramic material. Specifically, in one embodiment, the fibrous ceramic material is made by forming the modified aluminosilicate fibers via a reaction between two or more precursor materials, wherein at least one of the two or more precursor materials is in the form of a fiber. It is believed that a lower coefficient of thermal expansion (CTE) can be achieved by altering the chemical composition of the aluminosilicate fibers. That is, by altering x, y, z, and R, the chemical composition as well as the crystal structure are changed. As a result of the compositional and structural changes, the CTE value for the material can be tailored for a particular use (e.g., the CTE value can be lowered in one or more lattice directions). Due to the decrease in CTE, a porous, fibrous ceramic body with minimal cracking and minimal expansion at high temperatures can be generated.

In some embodiments, the CTE value of the fibrous ceramic material can be further lowered as a result of fiber orientation. The plurality of modified aluminosilicate fibers made by reaction can be extruded or otherwise shaped into a fibrous body. During extrusion or shaping, it is believed that fiber alignment occurs resulting in a decrease of the coefficient of thermal expansion (CTE) in at least one direction of the fibrous body.

In one aspect of the invention, embodiments described in the present disclosure are directed to a method of manufacturing a fibrous material wherein at least about 5% of all fibers within the fibrous material have a $x(RO).y(Al_2O_3).z(SiO_2)$ compositional structure, and R is selected from the group consisting of Ba, Sr, Li, and K. The method includes mixing at least two $x(RO).y(Al_2O_3).z(SiO_2)$ precursor materials to form a mixture (one or more of the at least two $x(RO).y(Al_2O_3).z(SiO_2)$ precursors being in the form of a fiber); extruding the mixture to create a fibrous body; and heat treating the fibrous body to form the fibrous material.

Embodiments of this aspect can include one or more of the following features. In some embodiments after heat treating the fibrous body at least about 25% of all fibers therein have the $x(RO).y(Al_2O_3).z(SiO_2)$ compositional structure. That is about 25% (e.g., 30%, 35%, 45%, 55%, 65% or more) of the precursor fibers reacted to form $x(RO).y(Al_2O_3).z(SiO_2)$ fibers. In certain embodiments, the precursor materials can be selected from the group consisting of mullite fibers, aluminosilicate fibers, $Li_2O$ particles, colloidal silica, and $SrCO_3$ particles. The mixture can, in some embodiments, further include one or more additives selected from the group consisting of a fluid, a binder, and a pore former. The one or more additives can be substantially removed by heating the fibrous body.

In another aspect, embodiments described in the present disclosure are directed to a method of manufacturing a fibrous body including modified aluminosilicate fibers having a $x(RO).y(Al_2O_3).z(SiO_2)$ compositional structure where R is selected from the group consisting of Ba, Sr, K, and Li. The method includes mixing at least two $x(RO).y(Al_2O_3).z(SiO_2)$ precursor materials to form a mixture, wherein one or more of the at least two $x(RO).y(Al_2O_3).z(SiO_2)$ precursor materials is in a form of a fiber; reacting the at least two $x(RO).y(Al_2O_3).z(SiO_2)$ precursors materials to form a plurality of fibers within the mixture that have the $x(RO).y(Al_2O_3).z(SiO_2)$ compositional structure; and shaping the mixture into the fibrous body, wherein at least about 5% of all fibers within the fibrous body have the $x(RO).y(Al_2O_3).z(SiO_2)$ compositional structure.

Embodiments of this aspect can include one or more the following features. In some embodiments at least about 25% of all fibers within the fibrous body after reacting the at least two $x(RO).y(Al_2O_3).z(SiO_2)$ precursor materials have the $x(RO).y(Al_2O_3).z(SiO_2)$ compositional structure. That is, at least 25% (e.g., 35%, 45%, 55%, 65%, 75%, 85%, 95%) of all the fibers within the fibrous body after the reaction of the precursors have the $x(RO).y(Al_2O_3).z(SiO_2)$ compositional structure. The fibers can be aligned such that at least about 20% of all of the fibers within the fibrous body are aligned in a common direction. In some embodiments, the $x(RO).y(Al_2O_3).z(SiO_2)$ precursor materials are selected from the group consisting of mullite fibers, aluminosilicate fibers, $Li_2O$ particles, colloidal silica, and $SrCO_3$ particles. The mixture described above can further include one or more additives selected from the group consisting of fluid, a binder, and a pore former. These additives can be substantially removed by heating the fibrous body.

In another aspect, embodiments are directed to a method of forming a porous honeycomb substrate. The method includes mixing at least two $x(RO).y(Al_2O_3).z(SiO_2)$ precursor materials to form a mixture, wherein one or more of the at least two precursor materials is in a form of a fiber and R is selected from the group consisting of Ba, Sr, K and Li; extruding the mixture to form a honeycomb substrate having a porosity of at least about 20%; and heat treating the honeycomb substrate to react the at least two precursors to form a plurality of fibers having a $x(RO).y(Al_2O_3).z(SiO_2)$ compositional structure so that at least about 5% of all fibers within the honeycomb substrate have the $x(RO).y(Al_2O_3).z(SiO_2)$ compositional structure.

Embodiments of this aspect include one or more of the following features. In some embodiments after heat treating the honeycomb substrate at least about 25% of all fibers have the $x(RO).y(Al_2O_3).z(SiO_2)$ compositional structure. The precursor materials utilized in the above method can be selected from the group consisting of mullite fibers, aluminosilicate fibers, $Li_2O$ particles, colloidal silica, and $SrCO_3$ particles. The mixture formed in the above method can further include one or more additives selected from the group consisting of a fluid, a binder, and a pore former. The one or more additives can be substantially removed by heating the honeycomb substrate.

In a further aspect of the invention, embodiments are directed to a modified aluminosilicate fibrous honeycomb body. The body includes a honeycomb array of walls defining channels between adjacent walls, the walls comprising a plurality of $x(RO).y(Al_2O_3).z(SiO_2)$ fibers bonded to form a porous structure having an open network of pores, wherein R is selected from the group consisting of Ba, Sr, K and Li. In some embodiments the fibers within the $x(RO).y(Al_2O_3).z(SiO_2)$ fibers within the walls are aligned in a common direction.

Embodiments of this aspect can include one or more of the following features. The walls of the honeycomb body can have a porosity of at least about 20% (e.g., 30%, 40%, 50%, 60%, 70%, 80%). The fibers within the walls can have an aspect ratio greater than 1 and less than or equal to 2,000. In some embodiments, a catalytic coating is disposed on the plurality of $x(RO).y(Al_2O_3).z(SiO_2)$ fibers.

In another aspect of the invention, embodiments are directed to a filter. The filter includes a housing including an inlet and an outlet. Disposed between the inlet and the outlet is a modified aluminosilicate fibrous honeycomb body. The body includes a honeycomb array of walls defining channels between adjacent walls, the walls comprising a plurality of $x(RO).y(Al_2O_3).z(SiO_2)$ fibers bonded to form a porous structure having an open network of pores, wherein R is selected from the group consisting of Ba, Sr, K and Li. In some embodiments the fibers within the $x(RO).y(Al_2O_3).z(SiO_2)$ fibers within the walls are aligned in a common direction. In certain embodiments, at least one catalyst is deposited on the plurality of $x(RO).y(Al_2O_3).z(SiO_2)$ fibers.

In yet another aspect, embodiments are directed to a method of manufacturing a fibrous material wherein at least about 5% of all fibers within the fibrous material have a $w(MO).x(RO).y(Al_2O_3).z(SiO_2)$ compositional structure, where R is selected from the group consisting of Ba, Sr, K, and Li. The method includes mixing at least two $w(MO).x$ $(RO).y(Al_2O_3).z(SiO_2)$ precursor materials to form a mixture, wherein one or more of the at least two precursor materials is in a form of a fiber; extruding the mixture to create a fibrous body; and heat treating the fibrous body to form the fibrous material. In some embodiments, the M in the $w(MO).x(RO).y(Al_2O_3).z(SiO_2)$ compositional structure is selected from the group consisting of Na and Ca. In certain embodiments, at least about 50% (e.g., 75%, 95%) of all fibers have the $w(MO).x(RO).y(Al_2O_3).z(SiO_2)$ compositional structure after heat treatment of the fibrous body.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

DETAILED DESCRIPTION

In general, by reducing a ceramic material's CTE value, cracking due to thermal stresses can be minimized. The ceramic materials described below have a low CTE value. It is believed that the ceramic materials described herein have achieved a low CTE value by a manipulation of one or more of the lattice parameters through an adjustment in compositional structure of the ceramic material. In addition, in some embodiments, a further decrease in CTE value may be achieved through fiber alignment within the ceramic material.

The ceramic materials described herein can be utilized in numerous applications, including but not limited to filters for diesel applications. In diesel automotive applications, using ceramic materials that have a high coefficient of thermal expansion within a catalytic filter can lead to poor or diminished performance and/or design flexibility. Specifically, diesel filters are prone to cracking during regeneration (i.e., a high temperature cycle used to burn out particulates trapped in the filter). Therefore, it would be advantageous to minimize the coefficient of thermal expansion of a ceramic material used in a diesel filter. In addition, performance of a diesel filter increases with an increased value for the thermal shock parameter (TSP). The thermal shock parameter is defined as follows: TSP=modulus of rupture (MOR) divided the product of Young's modulus and the coefficient of thermal expansion (CTE). As a result, a ceramic material having a low coefficient of thermal expansion will have greater performance.

Figure 1:
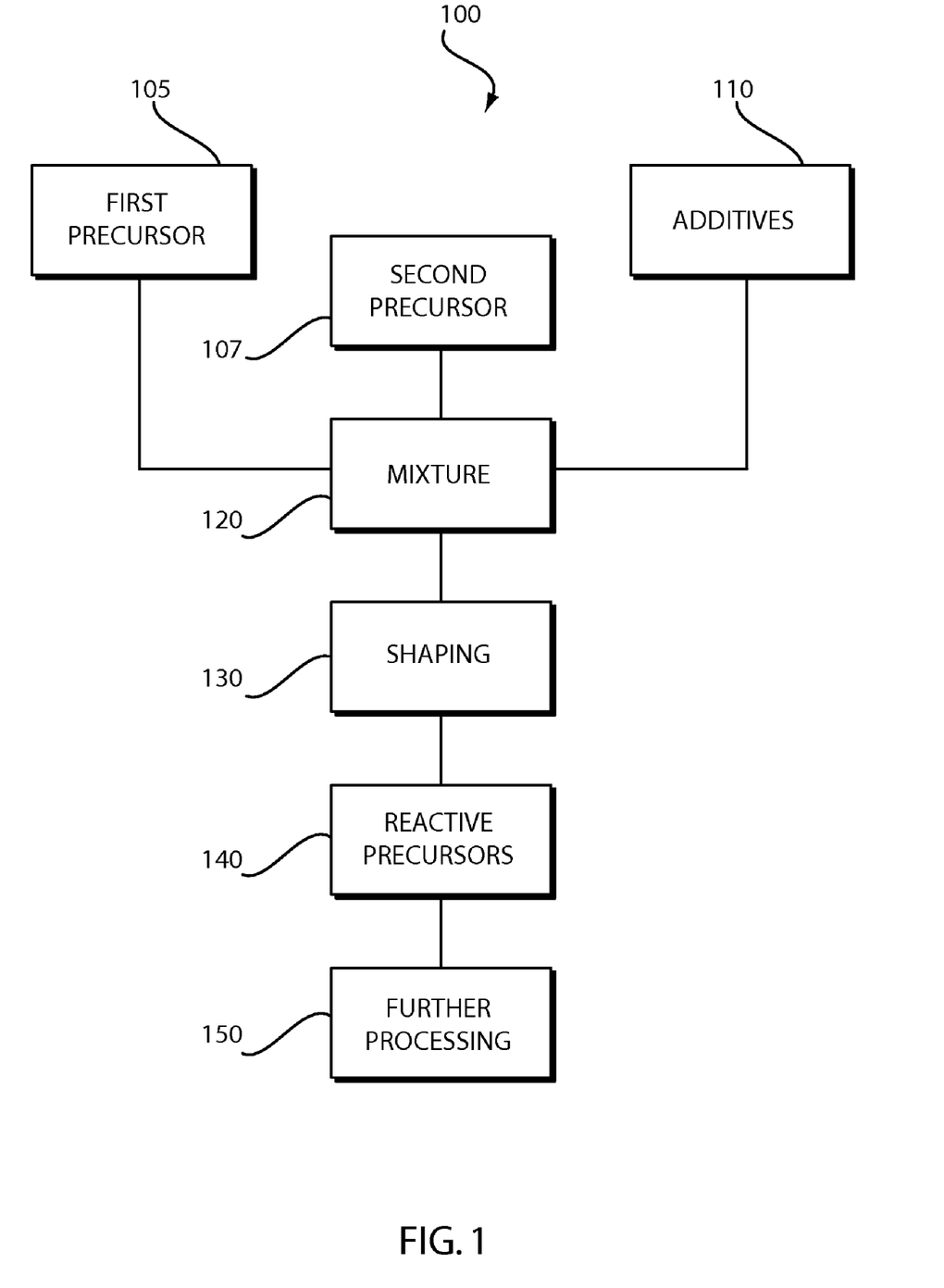
FIG. 1 is a flow chart illustrating a method of forming a fibrous material in accordance with an embodiment of the disclosure.

Referring to FIG. 1, a method 100 for manufacturing a fibrous ceramic material is illustrated. The fibrous ceramic material formed using this method has an ultimate or final structure (i.e., a structure after completion of the method shown in FIG. 1) in which at least about 5% of all fibers therein have a modified aluminosilicate, i.e., $x(RO).y(Al_2O_3).z(SiO_2)$, compositional structure, wherein x is greater than 0 and R is selected from the group consisting of Ba, Sr, Li, and K. The fibers within the final structure are interlocking, so as to form a three dimensional porous structure in which fluids (e.g., gases) can pass therethrough. The method includes mixing at least two $x(RO).y(Al_2O_3).z(SiO_2)$ precursor materials, such as a first precursor 105 and a second precursor 107 to form a mixture 120. (While FIG. 1, shows two precursors, any number of precursors greater than or equal to two can be utilized.) A $x(RO).y(Al_2O_3).z(SiO_2)$ precursor is a material that when reacted with other materials forms a portion of $x(RO).y(Al_2O_3).z(SiO_2)$ compositional structure. For example, a possible $x(RO).y(Al_2O_3).z(SiO_2)$ precursor is mullite (i.e., a fiber that includes both aluminum and silicon oxides); another possible precursor is $Al_2O_3$ powder; another possible precursor is a sol of any material including R, Al, and/or Si; still yet another precursor is $Li_2O$ particles where R in $x(RO).y(Al_2O_3).z(SiO_2)$ represents Li. Precursors 105 and 107 can come in a number of forms. For example, the precursors can be fiber based, colloidal based, particle/powder based, or liquid solution based. However, one or more of the at least two $x(RO).y(Al_2O_3).z(SiO_2)$ precursors (i.e., 105 and 107) is in the form of a fiber so that mixture 120 is a fiber based material. That is, at least one of precursor 105 and precursor 107 is in the form of a fiber, such as, for example, mullite fibers, aluminosilicate fibers, alumina fibers, or silicate fibers.

Optionally, additives 110, such as, for example binders, rheology modifiers (e.g., fluids), and pore formers can be introduced into mixture 120. These additives 110 can be used to modify or manipulate the consistency of mixture 120 so as to aid in later form shaping processes. In addition, these additives 110 can be used as pore place holders. That is, these additives are inert with respect to the $x(RO).y(Al_2O_3).z(SiO_2)$ precursors and can be removed from the mixture 120 after the form shaping processes, thereby allowing for increased porosity in the ultimate form.

Figure 2:
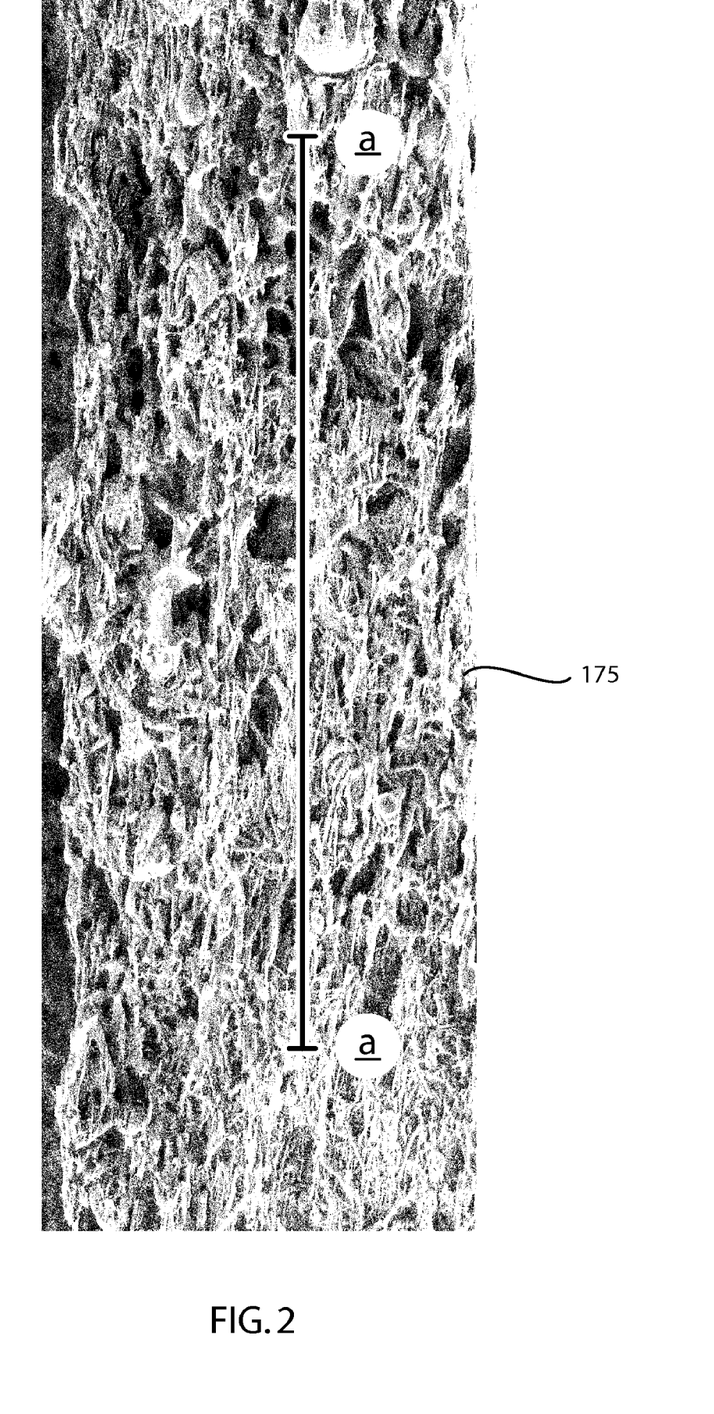
FIG. 2 is a micrograph a portion of a fibrous material formed in accordance with the method of FIG. 1.

After the $x(RO).y(Al_2O_3).z(SiO_2)$ precursors (i.e., 105 and 107) with any optional additives 110 are mixed and homogenized, the mixture 120 is shaped 130 into a form. In one embodiment, shaping 130 can occur by extrusion of the mixture 120. Without wishing to be bound by theory, it is believed that extrusion of a fibrous mixture, such as mixture 120, results in the substantial alignment of fibers. For example, it is believed that at least about 20% of the fibers within a fibrous mixture are substantially aligned in a common direction after extrusion. FIG. 2 shows an extruded fibrous structure 175 in which an average of about 70 to 80% of all fibers within the form are aligned along line a-a shown therein. Shear forces that act upon the mixture during extrusion tend to orient the fibers in the direction of extrusion. It will be appreciated that extrusion designs, mixture rheologies, fiber content and fiber rigidity can influence the orientation behavior of the extruded mixture.

Other shaping processes 130, other than extrusion, can also be utilized to create the form. Examples of other shaping processes include molding, such as injection molding, and casting. In these shaping processes, fiber alignment may occur to a lesser degree than with extrusion.

Once shaped, energy is applied to the form to initiate a reaction 140 between the precursors 105 and 107. For example, the form can be fired at a temperature of less than about 1,300° C. for several hours to cause a reaction between the two or more $x(RO).y(Al_2O_3).z(SiO_2)$ precursors. As a result of this reaction, at least 5% of all fibers within the form are transformed into $x(RO).y(Al_2O_3).z(SiO_2)$ fibers.

Figure 3A:
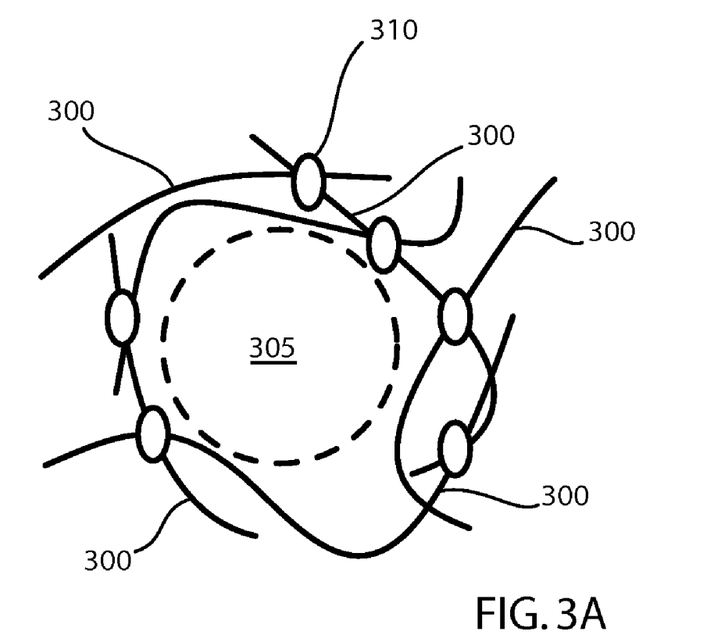
FIGS. 3A and 3B are cross-sectional schematics illustrating the presence and the absence of pore formers and binders prior to and after a heat treatment, respectively.
Figure 3B:
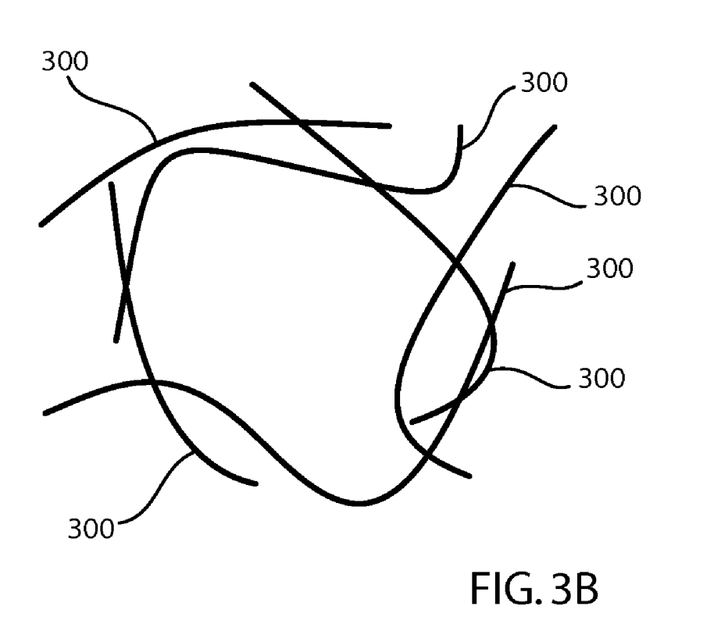

The application of energy (e.g., heat) also allows for the creation of bonds between the fibers. As heat is applied (e.g., directly in the case of a furnace or inductively as when an RF source is utilized), water and other additives are eliminated or reduced resulting in fiber-to-fiber contact. (See FIGS. 3A and 3B showing fiber 300 interactions as a result of the presence and the removal of pore formers 305 and binders 310, respectively). It will be appreciated that the bonds may be formed in several ways at these fiber-to-fiber contact sites. For example, a number of types of sintering mechanism can be utilized, including but not limited to liquid assisted sintering, solid state sintering, and reaction-phase sintering wherein a chemical reaction occurs at the fiber-to-fiber contact site. As a result of fiber bond formation, the ceramic material formed utilizing method 100 is a fibrous material having interlocked fibers, wherein at least 5% of all fibers have the $x(RO).y(Al_2O_3).z(SiO_2)$ compositional structure.

As an optional step, the fibrous form can be further processed as shown in step 150 in FIG. 1. Further processing steps include: (a) additional heat treatments to create further bonds between fibers or to remove additives such as pore formers, organic binders, and fluids, such as water (b) application of coatings, such as, for example catalytic coatings on the fibers, (c) introduction of increased porosity or creation of directed flow channels via mechanical processing (e.g., drilling or capping/filling passageways), and (d) incorporating the fibrous material into a filter or other apparatus.

Figure 4:
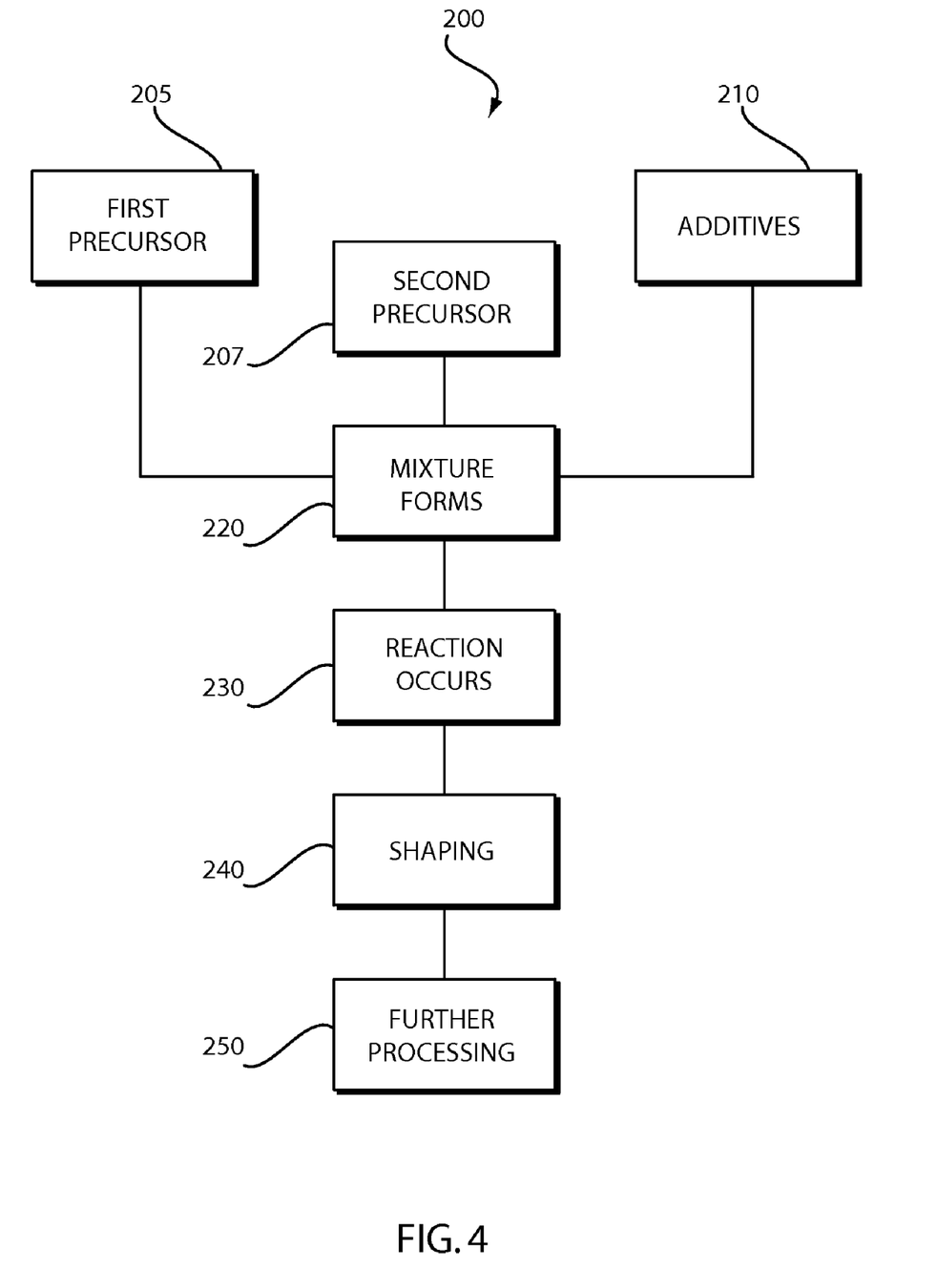
FIG. 4 is a flow chart illustrating another method of forming a fibrous material in accordance with an embodiment of the disclosure.

In another embodiment, shown in FIG. 4, a method 200 of forming a fibrous body includes mixing at least two $x(RO).y(Al_2O_3).z(SiO_2)$ precursors (205 and 207) together with any optional additives 210 to form a mixture 220. In general, R is metal, such as Li, K, Sr, and Ba. One or more of the at least two $x(RO).y(Al_2O_3).z(SiO_2)$ precursors 205 and 207 is in fiber form. Energy, such as heat or light, is applied to the mixture to initiate a reaction 230 between the two or more $x(RO).y(Al_2O_3).z(SiO_2)$ precursors. The optional additives 210 are inert with respect to the at least two $x(RO).y(Al_2O_3).z(SiO_2)$ precursors 205 and 207, and as a result do not participate in the reaction. The reacted mixture 230 is then shaped 240 into the fibrous body through extrusion, molding, or other shaping techniques. Optional processing steps 250, such as, for example, heat treating the fibrous body to remove or reduce the amount of optional additives 210, sintering the fibrous body to create bonds between fibers, introducing further porosity or directed flow channels into the fibrous body, depositing coatings, and/or incorporating the fibrous material into a filter or other apparatus can be performed after the fibrous body is shaped 240.

The $x(RO).y(Al_2O_3).z(SiO_2)$ precursors utilized in methods 100 and 200 can be supplied in various forms. As discussed above, one or more of the at least two $x(RO).y(Al_2O_3).z(SiO_2)$ precursors is in the form of a fiber so that any resulting mixture of the $x(RO).y(Al_2O_3).z(SiO_2)$ precursors is a fiber based material. An illustrative list of $x(RO).y(Al_2O_3).z(SiO_2)$ precursors in fiber form includes, but is not limited to: aluminosilicate fibers, such as for example, mullite fibers, aluminosilicate H95C fibers, strontium aluminum silicate fibers, lithium aluminum silicate fibers, and aluminoborosilicate fibers, $Al_2O_3$ fibers, and $SiO_2$ fibers. In general, these fibers have an aspect ratio (i.e., the ratio of the length of the fiber divided by the diameter of the fiber) greater than one. As used herein, the "diameter" of the fiber assumes for simplicity that the sectional shape of the fiber is a circle; this simplifying assumption is applied to fibers regardless of their true section shape (e.g., square, triangular, etc.) In certain embodiments, the fibers have an aspect ratio that is less than or equal to 2,000. That is, in certain embodiments, the fibers have a diameter in the micron or submicron range (e.g., 1 micron) while the length of the fibers is a few millimeters (e.g., 2 millimeters). In general, the fibers can have a diameter ranging from about 100 nm to about 100 microns. However, in certain embodiments, the fibers have a diameter within the range of about 100 nm to about 10 microns and in some embodiments, the fibers have a diameter within the range of about 2 microns to about 10 microns.

The at least two $x(RO).y(Al_2O_3).z(SiO_2)$ precursors can be all in fiber form or alternatively, the precursors can be any combination of fibers and some other form. Other $x(RO).y(Al_2O_3).z(SiO_2)$, which are not in fiber form, include but are not limited to: colloidal silica, silica particles, $Al_2O_3$ particles, sols of any material including Al, or Si, $SrCO_3$ particles where R is Sr, $K_2O$ particles where R is K, $Li_2O$ particles where R is Li, and BaO particles where R is Ba. The above list of precursors is for illustrative purposes only and is by no means exhaustive. That is, any precursor material that when reacted with other constituents forms a portion of a $x(RO).y(Al_2O_3).z(SiO_2)$ fiber can be utilized in methods 100 and 200.

The specific $x(RO).y(Al_2O_3).z(SiO_2)$ precursors and precursor amounts utilized are selected in accordance with a target fiber chemistry and crystal structure. That is, the amount and type of $x(RO).y(Al_2O_3).z(SiO_2)$ precursor 105/205 and the amount and type of $x(RO).y(Al_2O_3).z(SiO_2)$ precursors 107/207 are selected based on the target fiber chemistry and crystal structure. For example, if $(Li_2O)(Al_2O_3)$ $4(SiO_2)$, β-Spodumene is the target chemistry, then the following amounts of precursors can be mixed together to form the fibrous material: 78.1 grams of aluminosilicate fiber, 4.3 grams of $Li_2O$ particles, and 55.1 grams of colloidal silica. However, if the target chemistry was $(Li_2O)(Al_2O_3)$ $2(SiO_2)$, β-Eucryptite, then the following amounts of precursors are utilized to form this particular chemical composition: 78.1 grams of aluminosilicate fiber, 8.0 grams of $LiO_2$ particles and 14 grams of colloidal silica. That is, by lowering the amount of Si available to participate in the reaction, the target chemistry and thus crystal structure (e.g., lattice parameters) are changed. As a result, one can modify or alter the material properties of the fibrous material by selecting not only the types of precursors but also their relative amounts to each other.

In addition to determining the crystal structure of the resulting fiber, the relative amounts of the at least two precursors also affects the amount of precursor fibers that participate in reaction 140/230. In order for all of the precursor material to participate in the reaction 140/230 the relative amounts of the precursors should be substantially equal to their solubility limits for a particular solid solution having a particular crystal structure. If the relative amounts vary from the solubility limit but are still within a range therein to form a particular crystal structure, then the reaction can be limited due to a shortage of one or more elements. As a result, not all of the precursor fibers will participate in the reaction and thus some precursor fibers will remain in the fibrous body after reaction 140/230 has taken place. Accordingly, the fibrous body can include less than 100% $x(RO).y(Al_2O_3).z(SiO_2)$ fibers. For example, 5% of the fibers with a fibrous body are transformed to β-Spodumene, $(Li_2O).(Al_2O_3).4(SiO_2)$, fibers when a ratio of 91.6% aluminosilicate fibers:7.8% colloidal silica:0.6% $Li_2O$ particles are mixed together; whereas about 50% transformation occurs when a ratio of 56.8% aluminosilicate fibers: 40.1% colloidal silica:3.1% $Li_2O$ particles is used; whereas about 95 to 100% transformation occurs when a ratio of 40.6% aluminosilicate fibers:55.1% colloidal silica:4.3% $Li_2O$ particles is used.

With the ability to control fiber chemistry and crystal structure, the fibrous material can be tailored to provide a low CTE value. For example, aluminosilicate, is known to have a relatively low average CTE value ($4.6 \times 10^{-6}/°$ C.). However, by modifying the chemistry of aluminosilicate to $x(RO).y(Al_2O_3).z(SiO_2)$, lower CTE values, especially in a particular lattice direction can be achieved. Moreover, in certain embodiments, by providing fiber alignment within the fibrous material, further tailoring of the material's CTE value can be achieved.

The fibrous materials resulting from methods 100 and 200 can be shaped into porous honeycomb substrates or bodies, which can be utilized as filters and in particular, filters for automotive applications.

Figures 5, 6:
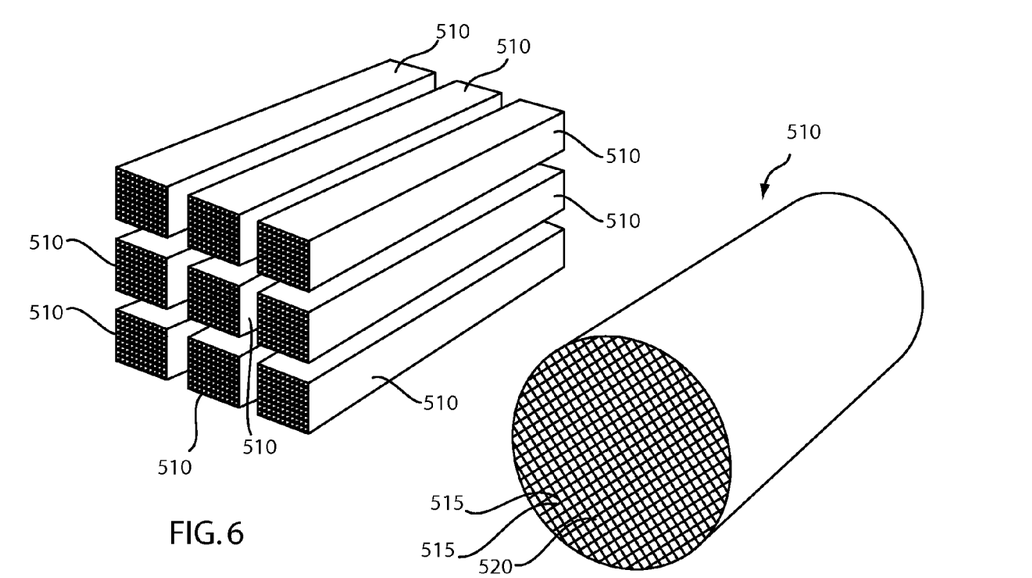
FIG. 5 is a schematic illustrated in a perspective view showing a honeycomb body.
FIG. 6 is a schematic illustrated in a perspective view showing multiple honeycomb bodies to be adjoined to form a larger body.

Referring to FIG. 5, a porous honeycomb body 510 is shown. The honeycomb body 510 has an array of walls 515 that define channels 520 between adjacent walls 515. The walls 515 comprise the fibrous material described above. That is, the walls 515 include a plurality of $x(RO).y(Al_2O_3).z(SiO_2)$ fibers bonded to form a porous structure. The porous structure has at least 20% porosity and typically has an open-network of pores so that fluids can flow through the structure. At least 20% (e.g., 25%, 30%, 40%, 50%, 60%, 70%, 80%) of the $x(RO).y(Al_2O_3).z(SiO_2)$ fibers within the walls 515 are aligned. As a result, material properties, such as the coefficient of thermal expansion, which have directional values, can be potentially further manipulated to provide a lower value in a particular direction. That is, the fibers can be aligned along a particular lattice direction, such as the lattice parameter (a, b, or c) which has the lowest CTE value. For example, if a particular material has the lowest CTE along the c direction, then the fibers can be extruded or otherwise shaped such that at least 20% of the fibers are substantially aligned along the c direction. The walls of the honeycomb body 510 can then be formed such that the c direction of the aligned fibers falls within the plane of the walls 515. As a result, the walls will experience the least amount of expansion when exposed to heat. Similarly, the fibers in the material can be aligned such that 20% or more of the fibers are aligned along a direction that has the highest CTE value. In this embodiment, the walls 515 of the honeycomb body 510 are formed such that the aligned fibers form the smallest dimension (i.e., depth) of the walls 515 so that the area greatest affected by heat is positioned to have the least structural effect.

While some lowering of the fibrous materials CTE value can be realized through fiber alignment, it is believed that tailoring the composition and crystal structure of the fibers is directly responsible for the low CTE values achieved. For example, by modifying alumina silica fibers with $LiO_2$ particles and colloidal silica to form β-Eucryptite, a reduction in CTE from approximately $4.6 \times 10^{-6}/°$ C. to $0.1 \times 10^{-6}/°$ C. can be realized.

The honeycomb body 510 can be fabricated in any number of shapes such as, for example, a cylinder (shown in FIG. 5), a pie-shaped wedge or subcylindrical section, a rectangle (as shown in FIG. 6), or a diamond. These honeycomb bodies 510 can be glued together to form a segmented body as shown in FIG. 6. As a result of gluing the bodies together, any size, shape, or dimension honeycomb form can be generated. With a low coefficient of thermal expansion porous fibrous material, it is possible to extrude or otherwise form shapes (e.g., cylinders) with large widths (e.g., diameters between 5.66 inches and 14 inches) without utilizing a low Young's modulus glue/adhesive to adjoin smaller segments to form a larger form. The ability to extrude or form larger widths provides flexibility in production techniques and potential cost reduction in volume production.

Figure 7:
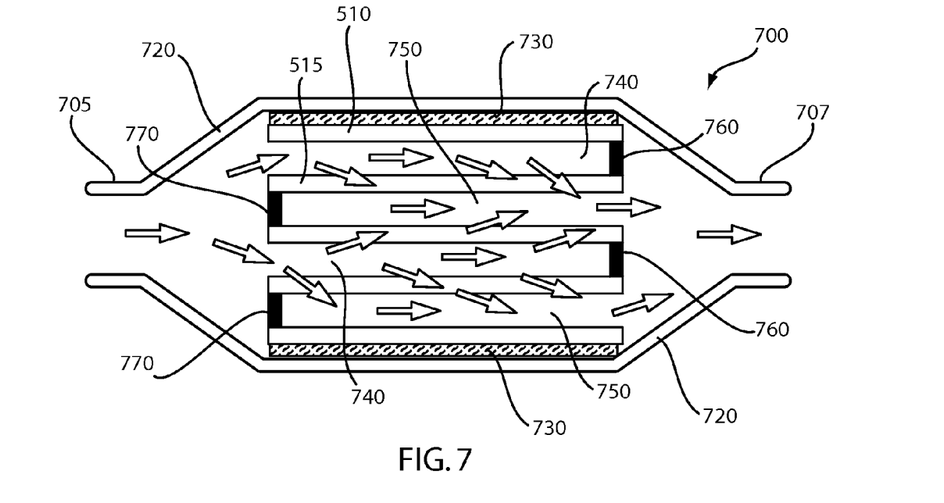
FIG. 7 is a cross-sectional schematic of a filter that includes a honeycomb body of FIG. 5.

FIG. 7 depicts a cross-sectional representation of a filter 700 utilizing the porous honeycomb body 510 of FIG. 5. The filter 700 includes a housing 720, which surrounds the porous honeycomb body 510. The housing includes an inlet 705 and an outlet 707 through which gasses, such as exhaust gasses, travel through. Between the housing 720 and the honeycomb body 510 is a mat 730 that supports and forms an air-tight seal between the housing 720 and the honeycomb body 510. The honeycomb body 510 is configured in a wall-flow configuration by selectively plugging alternate channels, with outlet blocks 760 and inlet blocks 770 to form a plurality of respective inlet channels 740 and outlet channels 750. In this embodiment, the open network of pores within the walls 515 provides sufficient porosity and permeability to permit flow through the walls 515 between the inlet and outlet channels 740, 750. As a result, particulate matter can be accumulated on the surface of the inlet channel walls 740, and be removed from the gas stream by means of the filter 700. Coatings, such as, catalytic coatings or other reactive coatings, can be deposited along the walls 515 to increase the concentration of particles captured by the walls 515. For example, for a filter used in a diesel automotive environment, the walls 515 can be coated with a catalytic coating that facilitates oxidation of accumulated soot and accelerates the conversion of exhaust gas into less-harmful constituents. Techniques for applying catalytic and other types of coatings to substrates and porous bodies are well known in the field of art.

Figure 8:
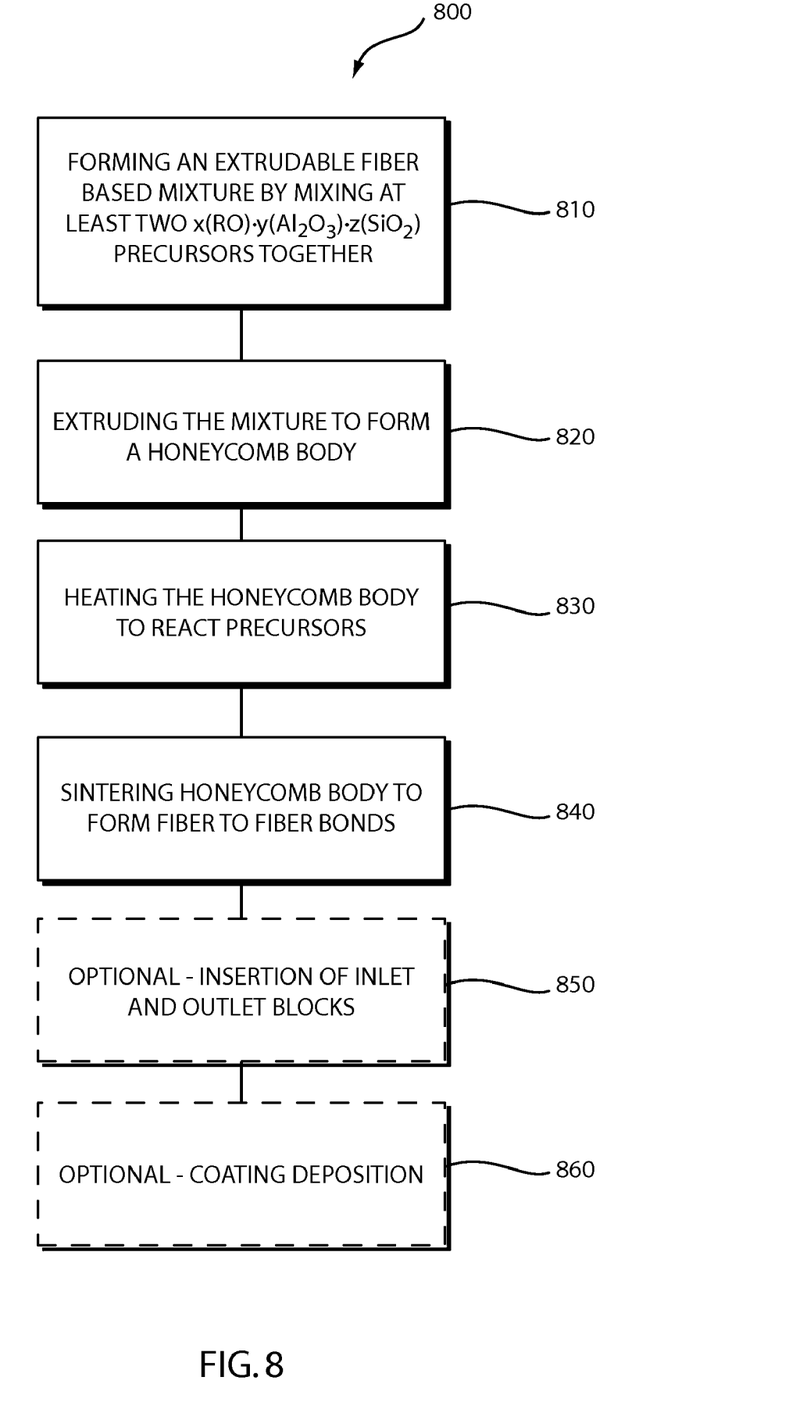
FIG. 8 is a schematic illustrating a method of forming a honeycomb body in accordance with an embodiment of the disclosure.

FIG. 8 illustrates a method of forming a honeycomb body, such as honeycomb body 510 of FIG. 5. First, as shown in step 810, at least two $x(RO).y(Al_2O_3).z(SiO_2)$ precursors (wherein one or more of the precursors is in fiber form and R is selected from the group consisting of Ba, Li, K and Sr are combined to form a mixture. Fluid, pore formers, or rheology agents such as binders can also be added to the mixture to enable efficient extrusion or shaping of the mixture. After obtaining a desired consistency, the mixture is extruded into a honeycomb body having at least 20% porosity (step 820) and then heated to react the at least two $x(RO).y(Al_2O_3).z(SiO_2)$ precursors and to substantially eliminate or remove the optional additives (i.e., fluids, pore formers, and binders (step 830). At least 5% of all of the fibers within the honeycomb body are transformed to have the $x(RO).y(Al_2O_3).z(SiO_2)$ compositional structure. Bonds between fibers (i.e., between the $x(RO).y(Al_2O_3).z(SiO_2)$ fibers formed in step 830 and any unreacted fibers) are formed via sintering 840 the honeycomb body. In some embodiments, steps 830 and 840 occur during one heat treatment process. In other embodiments, multiple heat treating processes are utilized to react $x(RO).y(Al_2O_3).z(SiO_2)$ precursors, to substantially eliminate optional additives, and to sinter fibers. In embodiments where the honeycomb body is a filter, inlet and outlet blocks (e.g., 740, 750 in FIG. 7) are inserted to create a flow path through the filter (optional step 850). In addition, a catalytic coating can be applied to the filter to provide the filter with reactive functionality in its intended application, such as, for example, to promote oxidation of captured soot in a diesel particulate filter (optional step 860).

Variations, modifications, and other implementations of what is described herein will occur to those of ordinary skill in the art without departing from the spirit and scope of the invention. For example, while an number of embodiments have been described in which the fibrous material has been utilized as a filter, especially a filter for diesel applications, the fibrous material can be used in any application where a low coefficient of thermal expansion ceramic material would be desired, such as for example, in the aerospace industry, liquid filtration, cross flow filtration, molten metal filtration, fixed bed chemical reactors, honeycomb high surface area adsorbents, and high temperature reactors.

EXAMPLES

The following examples are provided to further illustrate and to facilitate the understanding of the disclosure. These specific examples are intended to be illustrative of the disclosure and are not intended to be limiting.

In a first illustrative example in which the target fiber chemistry is β-Eucryptite, $(Li_2O).(Al_2O_3).2(SiO_2)$, the following precursors are mixed together: 80 grams of aluminosilicate fibers, 5.0 grams of $Li_2O$ particles, and 14.0 grams of colloidal silica. The following additives are also added to form an extrudable mixture: 16 grams of hydroxypropyl methylcellulose (an organic binder and rheology modifier), 20 grams of carbon particles (−45 micron mesh grade and utilized as a pore former), and 50 grams of deionized water as a mixing fluid. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 67% porosity. Approximately, 99% of all of the aluminosilicate fibers utilized in the extrudable mixture reacted to form β-Eucryptite fibers. In this embodiment, the coefficient of thermal expansion of the porous ceramic body is $0.1 \times 10\text{-}6/°$ C.

In a second illustrative in which the target fiber chemistry is β-Eucryptite, $(Li_2O).(Al_2O_3).2(SiO_2)$, the following precursors are mixed together: 29.1 grams of mullite fibers, 2.9 grams of $Li_2O$ particles, and 38.2 grams of colloidal silica. The following additives are also added to form an extrudable mixture: 16 grams of hydroxypropyl methylcellulose, 20 grams of carbon particles (−45 micron mesh grade), and 40 grams of deionized water. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 69% porosity. Approximately, 99% of all of the mullite fibers utilized in the extrudable mixture reacted to form β-Eucryptite fibers. In this embodiment, the coefficient of thermal expansion of the porous ceramic body is $0.12 \times 10\text{-}6/°$ C.

In a third illustrative in which the target fiber chemistry is β-Spodumene, $(Li_2O).(Al_2O_3).4(SiO_2)$, the following precursors are mixed together: 40.6 grams of aluminosilicate fibers, 4.3 grams of $Li_2O$ particles, and 55.1 grams of colloidal silica. The following additives are also added to form an extrudable mixture: 16 grams of hydroxypropyl methylcellulose, 20 grams of carbon particles (−45 micron mesh grade), and 40 grams of deionized water. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 79% porosity. Approximately, 99% of all of the aluminosilicate fibers utilized in the extrudable mixture reacted to form β-Spodumene fibers. In this embodiment, the coefficient of thermal expansion of the porous ceramic body is $0.90 \times 10\text{-}6/°$ C.

In a fourth illustrative in which the target fiber chemistry is β-Spodumene, $(Li_2O).(Al_2O_3).4(SiO_2)$, the following precursors are mixed together: 56.8 grams of aluminosilicate fibers, 3.1 grams of $Li_2O$ particles, and 40.1 grams of colloidal silica. The following additives are also added to form an extrudable mixture: 16 grams of hydroxypropyl methylcellulose, 20 grams of carbon particles (−45 micron mesh grade), and 45 grams of deionized water. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 78% porosity. Approximately, 50% of all of the aluminosilicate fibers utilized in the extrudable mixture reacted to form β-Spodumene fibers. In this embodiment, the coefficient of thermal expansion of the porous ceramic body is 2.75×10-6/° C.

In a fifth illustrative embodiment in which the target fiber chemistry is β-Spodumene, $(Li_2O).(Al_2O_3).4(SiO_2)$, the following precursors are mixed together: 80.2 grams of aluminosilicate fibers, 1.4 grams of $Li_2O$ particles, and 18.4 grams of colloidal silica. The following additives are also added to form an extrudable mixture: 16 grams of hydroxypropyl methylcellulose, 20 grams of carbon particles (−45 micron mesh grade), and 55 grams of deionized water. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 65% porosity. Approximately, 25-35% of all of the aluminosilicate fibers utilized in the extrudable mixture reacted to form β-Spodumene fibers. In this embodiment, the coefficient of thermal expansion of the porous ceramic body is 3.90×10-6/° C.

In a sixth illustrative embodiment in which the target fiber chemistry is β-Spodumene, $(Li_2O).(Al_2O_3).4(SiO_2)$, the following precursors are mixed together: 91.6 grams of aluminosilicate fibers, 0.6 grams of $Li_2O$ particles, and 7.8 grams of colloidal silica. The following additives are also added to form an extrudable mixture: 16 grams of hydroxypropyl methylcellulose, 20 grams of carbon particles (−45 micron mesh grade), and 55 grams of deionized water. The materials are mixed into the extrudable mixture and formed into 1" diameter honeycomb substrates by extrusion. The substrates are dried using a radio-frequency (RF) drying facility, followed by a sintering operation at 1,200° C. for two hours to form a porous honeycomb structure having about 65% porosity. Approximately 5-10% of all of the aluminosilicate fibers utilized in the extrudable mixture reacted to form β-Spodumene fibers. In this embodiment, the coefficient of thermal expansion of the porous ceramic body is 4.70×10-6/° C.

In a seventh illustrative example in which the target fiber chemistry is $(SrO).(Al_2O_3).2(SiO_2)$, known as SAS, the following precursors are mixed together: 52.6 grams of aluminosilicate fibers, 38.1 grams of $SrCO_3$ particles, and 9.4 grams of colloidal silica. The following additives are also added to form an extrudable mixture: 16 grams of hydroxypropyl methylcellulose, 20 grams of carbon particles (−45 micron mesh grade), and 70 grams of deionized water. The materials are mixed into the extrudable mixture and formed into 1" diameter honeycomb substrates by extrusion. The substrates are dried using a radio-frequency (RF) drying facility, followed by a sintering operation at 1,100° C. for two hours to form a porous honeycomb structure having about 89% porosity. Approximately, 99% of all of the aluminosilicate fibers utilized in the extrudable mixture reacted to form SAS fibers. In this embodiment, the coefficient of thermal expansion of the porous ceramic body is 2.7×10-6/° C.

In an eighth illustrative example in which the target fiber chemistry is $(SrO).(Al_2O_3).2(SiO_2)$, known as SAS, the following precursors are mixed together: 30.1 grams of mullite fibers, 32.6 grams of $SrCO_3$ particles, and 37.4 grams of colloidal silica. The following additives are also added to form an extrudable mixture: 16 grams of hydroxypropyl methylcellulose, 20 grams of carbon particles (−45 micron mesh grade), and 35 grams of deionized water. The materials are mixed into the extrudable mixture and formed into 1" diameter honeycomb substrates by extrusion. The substrates are dried using a radio-frequency (RF) drying facility, followed by a sintering operation at 1,100° C. for two hours to form a porous honeycomb structure having about 89% porosity. Approximately, 99% of all of the mullite fibers utilized in the extrudable mixture reacted to form SAS fibers. In this embodiment, the coefficient of thermal expansion of the porous ceramic body is 2.9×10-6/° C.

In a ninth illustrative example in which the target fiber chemistry is a $Na_2O$ modified β-Spodumene, $(Na_2O).(Li_2O).(Al_2O_3).(SiO_2)$, the following precursors are mixed together: 37.2 grams of aluminosilicate fibers, 4.3 grams of $Li_2O$ particles, 55.1 grams of colloidal silica, 3.4 grams of $Na_2CO_3$ particles. The following additives are also added to form an extrudable mixture: 16 grams of hydroxypropyl methylcellulose, 20 grams of carbon particles (−45 micron mesh grade), and 40 grams of deionized water. The materials are mixed into the extrudable mixture and formed into 1" diameter honeycomb substrates by extrusion. The substrates are dried using a radio-frequency (RF) drying facility, followed by a sintering operation at 1,250° C. for two hours to form a porous honeycomb structure having about 89% porosity. At least 95% of all of the aluminosilicate fibers utilized in the extrudable mixture reacted to form $Na_2O$ modified β-Spodumene fibers. In this embodiment, the coefficient of thermal expansion of the porous ceramic body is 1.9×10-6/° C.

In a tenth illustrative example in which the target fiber chemistry is a $Ca_2O$ modified β-Spodumene, $(Ca_2O).(Li_2O).(Al_2O_3).(SiO_2)$, the following precursors are mixed together: 37.2 grams of aluminosilicate fibers, 4.3 grams of $Li_2O$ particles, 55.1 grams of colloidal silica, 3.6 grams of $Ca_2CO_3$ particles. The following additives are also added to form an extrudable mixture: 16 grams of hydroxypropyl methylcellulose, 20 grams of carbon particles (−45 micron mesh grade), and 40 grams of deionized water. The materials are mixed into the extrudable mixture and formed into 1" diameter honeycomb substrates by extrusion. The substrates are dried using a radio-frequency (RF) drying facility, followed by a sintering operation at 1,250° C. for two hours to form a porous honeycomb structure having about 89% porosity. At least 95% of all of the aluminosilicate fibers utilized in the extrudable mixture reacted to form $Ca_2O$ modified β-Spodumene fibers. In this embodiment, the coefficient of thermal expansion of the porous ceramic body is 0.8×10-6/° C.

We claim:

1. A method of manufacturing a fibrous material wherein at least about 5% of all fibers within the fibrous material have a $x(RO).y(Al_2O_3).z(SiO_2)$ compositional structure, where R is selected from the group consisting of Ba, Sr, K, and Li, the method comprising:

mixing at least two $x(RO).y(Al_2O_3).z(SiO_2)$ precursor materials to form a mixture, wherein one or more of the at least two $x(RO).y(Al_2O_3).z(SiO_2)$ precursor materials is in a form of a fiber;

extruding the mixture to create a fibrous body; and heat treating the fibrous body to form the fibrous material.

2. The method of claim 1 wherein after heat treating at least about 25% of all fibers within the fibrous body have the $x(RO).y(Al_2O_3).z(SiO_2)$ compositional structure.

3. The method of claim 1 wherein one or more of the at least two $x(RO).y(Al_2O_3).z(SiO_2)$ precursor materials is selected from the group consisting of: mullite fibers, aluminosilicate fibers, $Li_2O$ particles, colloidal silica, and $SrCO_3$ particles.

4. The method of claim 1 wherein the mixture further comprises one or more additives selected from the group consisting of a fluid, a binder, and a pore former.

5. The method of claim 4 wherein the one or more additives are substantially removed by heating the fibrous body.

6. A method of manufacturing a fibrous body including modified aluminosilicate fibers having a $x(RO).y(Al_2O_3).z(SiO_2)$ compositional structure where R is selected from the group consisting of Ba, Sr, K, and Li, the method comprising:
  mixing at least two $x(RO).y(Al_2O_3).z(SiO_2)$ precursor materials to form a mixture, wherein one or more of the at least two $x(RO).y(Al_2O_3).z(SiO_2)$ precursor materials is in a form of a fiber;
  reacting the at least two $x(RO).y(Al_2O_3).z(SiO_2)$ precursor materials to form a plurality of fibers within the mixture that have the $x(RO).y(Al_2O_3).z(SiO_2)$ compositional structure; and
  shaping the mixture into the fibrous body, wherein at least about 5% of all fibers within the fibrous body have the $x(RO).y(Al_2O_3).z(SiO_2)$ compositional structure.

7. The method of claim 6 wherein at least about 25% of all fibers within the fibrous body after reacting the at least two $x(RO).y(Al_2O_3).z(SiO_2)$ precursor materials have the $x(RO).y(Al_2O_3).z(SiO_2)$ compositional structure.

8. The method of claim 6 wherein at least about 20% of all fibers within the fibrous body are aligned in a common direction.

9. The method of claim 6 wherein one or more of the at least two $x(RO).y(Al_2O_3).z(SiO_2)$ precursor materials is selected from the group consisting of: mullite fibers, aluminosilicate fibers, $Li_2O$ particles, colloidal silica, and $SrCO_3$ particles.

10. The method of claim 6 wherein the mixture further comprises one or more additives selected from the group consisting of a fluid, a binder, and a pore former.

11. The method of claim 10 wherein the one or more additives are substantially removed by heating the fibrous body.

12. A method of forming a porous honeycomb substrate, the method comprising:
  mixing at least two $x(RO).y(Al_2O_3).z(SiO_2)$ precursor materials to form a mixture, wherein one or more of the at least two $x(RO).y(Al_2O_3).z(SiO_2)$ precursor materials is in a form of a fiber and R is selected from the group consisting of Ba, Sr, K, and Li;
  extruding the mixture to form a honeycomb substrate having a porosity of at least about 20%; and
  heat treating the honeycomb substrate to react the at least two $x(RO).y(Al_2O_3).z(SiO_2)$ precursor materials to form a plurality of fibers having a $x(RO).y(Al_2O_3).z(SiO_2)$ compositional structure so that at least about 5% of all fibers within the honeycomb substrate have the $x(RO).y(Al_2O_3).z(SiO_2)$ compositional structure.

13. The method of claim 12 wherein after heat treating the honeycomb substrate at least about 25% of all fibers have the $x(RO).y(Al_2O_3).z(SiO_2)$ compositional structure.

14. The method of claim 12 wherein one or more of the at least two $x(RO).y(Al_2O_3).z(SiO_2)$ precursor materials is selected from the group consisting of: mullite fibers, aluminosilicate fibers, $Li_2O$ particles, colloidal silica, and $SrCO_3$ particles.

15. The method of claim 12 wherein the mixture further comprises one or more additives selected from the group consisting of a fluid, a binder, and a pore former.

16. The method of claim 15 wherein the one or more additives are substantially removed by heating the honeycomb substrate.

17. A modified aluminosilicate fibrous honeycomb body comprising:
  a honeycomb array of walls defining channels between adjacent walls;
  the walls comprising a plurality of $x(RO).y(Al_2O_3).z(SiO_2)$ fibers bonded to form a porous structure having an open network of pores, wherein R is selected from the group consisting of is selected from the group consisting of Ba, Sr, K, and Li, and at least about 20% of the plurality of $x(RO).y(Al_2O_3).z(SiO_2)$ fibers within the walls are aligned in a common direction.

18. The modified aluminosilicate fibrous honeycomb body of claim 17, wherein the walls have a porosity of at least about 20%.

19. The modified aluminosilicate fibrous honeycomb body of claim 17 wherein the plurality of $x(RO).y(Al_2O_3).z(SiO_2)$ fibers have an aspect ratio greater than 1 and less than or equal to 2,000.

20. The modified aluminosilicate fibrous honeycomb body of claim 17 further comprising a catalytic coating on the plurality of $x(RO).y(Al_2O_3).z(SiO_2)$ fibers.

21. A filter comprising:
  a housing including an inlet and an outlet; and
  the modified aluminosilicate fibrous honeycomb body of claim 17 disposed between the inlet and the outlet.

22. The filter of claim 21 further comprising at least one catalyst deposited on the plurality of $x(RO).y(Al_2O_3).z(SiO_2)$ fibers of the walls.

23. A method of manufacturing a fibrous material wherein at least about 5% of all fibers within the fibrous material have a $w(MO).x(RO).y(Al_2O_3).z(SiO_2)$ compositional structure, where R is selected from the group consisting of Ba, Sr, K, and Li, the method comprising:
  mixing at least two $w(MO).x(RO).y(Al_2O_3).z(SiO_2)$ precursor materials to form a mixture, wherein one or more of the at least two $w(MO).x(RO).y(Al_2O_3).z(SiO_2)$ precursor materials is in a form of a fiber;
  extruding the mixture to create a fibrous body; and
  heat treating the fibrous body to form the fibrous material.

24. The method of claim 23, wherein M is selected from the group consisting of Na and Ca.

25. The method of claim 23, wherein after heat treating at least about 95% of all fibers within the fibrous body have the $w(MO).x(RO).y(Al_2O_3).z(SiO_2)$ compositional structure.

* * * * *